(12) United States Patent
Boveroux et al.

(10) Patent No.: US 10,173,363 B2
(45) Date of Patent: Jan. 8, 2019

(54) METHOD FOR MANUFACTURING COMPOSITE CONNECTING RODS

(71) Applicants: Benoît Boveroux, Rocourt (BE); Daniel Dardenne, Heure-le-Romain (BE)

(72) Inventors: Benoît Boveroux, Rocourt (BE); Daniel Dardenne, Heure-le-Romain (BE)

(73) Assignee: BD Invent, Heure-le-Romain (Oupeye) (BE)

(*) Notice: Subject to any disclaimer, the term of this patent is extended or adjusted under 35 U.S.C. 154(b) by 406 days.

(21) Appl. No.: 14/701,793

(22) Filed: May 1, 2015

(65) Prior Publication Data

US 2015/0231836 A1    Aug. 20, 2015

Related U.S. Application Data

(63) Continuation-in-part of application No. 13/380,639, filed as application No. PCT/EP2010/059062 on Jun. 25, 2010, now Pat. No. 9,050,759.

(30) Foreign Application Priority Data

Jun. 26, 2009    (EP) ..................................... 09163904

(51) Int. Cl.
*B29C 53/56*    (2006.01)
*B29C 70/32*    (2006.01)
(Continued)

(52) U.S. Cl.
CPC ............ *B29C 53/566* (2013.01); *B29C 53/56* (2013.01); *B29C 53/585* (2013.01); *B29C 53/66* (2013.01);
(Continued)

(58) Field of Classification Search
None
See application file for complete search history.

(56) References Cited

U.S. PATENT DOCUMENTS

| 4,704,918 A | 11/1987 | Orkin et al. |
| 5,233,737 A * | 8/1993 | Policelli ................ F16L 11/083 |
| | | 285/390 |

(Continued)

FOREIGN PATENT DOCUMENTS

| BE | 1016715 A3 | 5/2007 |
| EP | 0626250 A1 | 11/1994 |

(Continued)

*Primary Examiner* — Benjamin A Schiffman
(74) *Attorney, Agent, or Firm* — Reinhart Boerner Van Deuren P.C.

(57) ABSTRACT

The present invention relates to a method for manufacturing a connecting rod including: a) manufacturing an inner body; b) adding one end of the inner body to the end of the reduced outer diameter of each end piece, said end of the inner body resting on the shoulder of the end piece; c) inserting a first portion of a second mandrel in the hollow cylindrical portion of each end piece and placing a driving bit at the free end of a second portion of the second mandrel; d) winding said pre-impregnated fibres onto the outer surface of an assembly consisting of the inner body, the end piece(s) and the second part(s) of the second mandrel(s) which are free of bits, said fibres then forming an outer body; e) after removing the bit(s), polymerising the inner body and the outer body to form a polymerised integral body; f) removing the second mandrel(s) and cutting the polymerised integral body to the required length.

6 Claims, 7 Drawing Sheets

(51) Int. Cl.

| | | |
|---|---|---|
| *F16C 7/02* | (2006.01) | |
| *B29C 70/06* | (2006.01) | |
| *B29C 70/30* | (2006.01) | |
| *B29C 70/86* | (2006.01) | |
| *B29C 65/00* | (2006.01) | |
| *B29C 70/72* | (2006.01) | |
| *B29C 70/84* | (2006.01) | |
| *B29C 53/58* | (2006.01) | |
| *B29C 53/66* | (2006.01) | |
| *B33Y 70/00* | (2015.01) | |
| *B29K 63/00* | (2006.01) | |
| *B29K 307/04* | (2006.01) | |
| *B29K 105/08* | (2006.01) | |
| *B29L 31/06* | (2006.01) | |
| *B29C 53/82* | (2006.01) | |
| *B29K 307/00* | (2006.01) | |
| *B29K 705/00* | (2006.01) | |
| *B29K 105/06* | (2006.01) | |
| *B29L 31/00* | (2006.01) | |
| *B29K 305/00* | (2006.01) | |
| *B29K 707/04* | (2006.01) | |

(52) U.S. Cl.
CPC ...... *B29C 66/1122* (2013.01); *B29C 66/5344* (2013.01); *B29C 66/543* (2013.01); *B29C 66/721* (2013.01); *B29C 66/742* (2013.01); *B29C 66/7444* (2013.01); *B29C 70/06* (2013.01); *B29C 70/30* (2013.01); *B29C 70/32* (2013.01); *B29C 70/72* (2013.01); *B29C 70/84* (2013.01); *B29C 70/86* (2013.01); *B29C 70/865* (2013.01); *B33Y 70/00* (2014.12); *F16C 7/026* (2013.01); *B29C 53/821* (2013.01); *B29K 2063/00* (2013.01); *B29K 2105/06* (2013.01); *B29K 2105/0872* (2013.01); *B29K 2305/00* (2013.01); *B29K 2307/00* (2013.01); *B29K 2307/04* (2013.01); *B29K 2705/00* (2013.01); *B29K 2707/04* (2013.01); *B29L 2031/06* (2013.01); *B29L 2031/75* (2013.01); *Y10T 74/2142* (2015.01)

(56) References Cited

U.S. PATENT DOCUMENTS

| | | |
|---|---|---|
| 5,428,896 A | 7/1995 | Auberon et al. |
| 7,731,593 B2 | 6/2010 | Dewhirst et al. |
| 2003/0125117 A1 | 7/2003 | Burkett |
| 2008/0129041 A1 | 6/2008 | Allen et al. |

FOREIGN PATENT DOCUMENTS

| | | |
|---|---|---|
| FR | 2645070 A3 | 10/1990 |
| FR | 2705610 | 12/1994 |
| GB | 2008484 A | 6/1979 |
| JP | S59-50216 | 3/1984 |
| WO | WO 2008/066606 A1 | 6/2008 |
| WO | WO 2010/084286 A1 | 7/2010 |
| WO | WO 2010/149768 A2 | 12/2010 |

* cited by examiner (a)

(b)

METHOD FOR MANUFACTURING COMPOSITE CONNECTING RODS

CROSS-REFERENCE TO RELATED PATENT APPLICATIONS

This patent application is a continuation-in-part of co-pending U.S. patent application Ser. No. 13/380,639, filed Feb. 7, 2012, which is a 371 National Phase Application of Application No. PCT/EP2010/059062, filed Jun. 25, 2010, which claims priority to European Application No. 09163904.7, filed Jun. 26, 2009, the entire teachings and disclosures of which are incorporated herein by reference thereto.

FIELD OF THE INVENTION

The present invention relates to a method for manufacturing composite connecting rods. It more particularly but not exclusively relates to a method for manufacturing connecting rods that can be used in the field of aeronautics and aerospace.

The invention also relates to the connecting rods obtained according to the method and to the end-pieces used for manufacturing the connecting rod.

STATE OF THE ART

It is known that a connecting rod is a component either for stiffening or for transmitting movement. The forces transmitted by the connecting rod are mainly tensile, compression and bending forces based on resistance torque at the end of the rod.

In the field of aeronautics, use is made of a high number of connecting rods. Mention may be made of the use of rods in members for flight control, landing gear, door opening, etc. As an illustration, FIG. 1 represents a general diagram of a connecting rod with different, non-exhaustive means for securing at the ends parts; these means ensure the securing of the rod to the members to which it must transmit a movement or from which it is to receive a movement, or to ensure the securing thereof.

A connecting rod is a component that must meet several criteria. It must be able to withstand major thermal variations, the rod being subjected to temperatures oscillating between −55 and 120° C. It must also have a mechanical strength/weight ratio that is as high as possible. For this purpose, the connecting rod is of hollow design and the thickness of the walls at the central part of the rod body is thinner than the parts located at the ends where the end-pieces are secured as will be described below (see FIG. 2).

In their most frequent design, connecting rods are made of aluminium or stainless steel depending on their application.

Connecting rods in composite material are also commercially available.

They may be of a single-piece type such as shown in FIG. 3. The method for manufacturing such a connecting rod is described in document FR 2 705 610 A1. The method consists in depositing pre-impregnated fibres on an extractable mandrel with a shape corresponding to the shape of the rod. The assembly obtained is then polymerized with homogeneous pressure being applied over the entire outer surface of the assembly and finally, after the mandrel is extracted, the rod is machined to the required dimensions. This method is relatively costly and requires the presence of a mandrel of complex shape and its withdrawal.

A method for manufacturing rods is also known from document GB 2 008 484 A, in which a fibre-reinforced plastic material surrounds an expendable mandrel and the anchoring part of each end fitting (securing means) so that when the plastic material is polymerized, the connecting rod is obtained in a single piece. The expendable mandrel is a thin-walled metal tube, a tube in expanded material or a tube in plastic-reinforced fibre and with thin wall. In this embodiment, using different materials for the mandrel and the polymerized layer causes heat-expansion differences to appear with use. These will translate in the onset of cracks and lifting at the interface. If the tube is also made of a composite material with organic matrix, the use of different resins for the mandrel and the polymerized layer translates in contamination and ageing problems. In general, discontinuities and porosities are observed through the section of the rod body when different materials are used for its manufacturing.

Also known from document US 2008/0129041 A1 is a method for manufacturing a connecting rod by the lay-up technique. This technique has the disadvantage of not allowing an accurate positioning of the fiber for several reasons:

- the plies must be tailored to complementally match the stepped profile of the end fittings. In practice, there are gaps between the steps and the plies because it is a manual operation and because the edges of the plies are not perfectly straight. It results from these gaps that the final product is porous and comprises regions only filled up with the resin flowing during curing, leading to a product with poor properties;
- after applying the plies, there is a step of compaction leading to an uncontrolled displacement of the fiber, having a negative impact on the load distribution in use between the resin and the fiber, the former being not able to transmit important loads;
- the lay-up technique is a primarily manual operation as already mentioned. Therefore it cannot be guaranteed that the placement of the fibers, and thereby the mechanical properties, are identical from one connecting rod to the next; this lack of repeatability of the mechanical properties being extremely detrimental in the aeronautics field.

Connecting rods may also be found with an added metallic end-piece bonded to the body of the composite rod (see FIG. 4: the rod body and the end-piece are shown with and without shading, respectively). The disadvantage of such assembly is that it weakens the rod body. When a tensile force is exerted on the metallic end-piece of the rod, the adhesive is worked elastically and causes spacing between the metallic end-piece and the composite part (see FIG. 5(a)). When the end-piece is compressed on the rod, the adhesive is still elastically worked and sets up a bearing point between the metallic end-piece and the composite part (see FIG. 5(b)). With fatigue cycles, this phenomenon will generate cracking on the body of the composite rod and substantially reduce the lifetime of the connecting rod (see FIG. 5(c)).

AIMS OF THE INVENTION

The present invention aims to provide a solution allowing to overcome the drawbacks of the state of the art.

More particularly, the present invention aims to manufacture connecting rods with a fully homogeneous structure, devoid of any porosity and meeting the criteria of mechanical strength and heat resistance.

The present invention also aims to develop a method allowing a controlled positioning of the fibre in the connecting rod.

The present invention has the further aim to manufacture connecting rods with a method close to conventional methods but generating low production costs whilst avoiding the drawbacks of a bonded assembly.

MAIN CHARACTERISTIC ELEMENTS OF THE INVENTION

The present invention relates to a method for manufacturing a connecting rod comprising a rod body in composite material and at least one end-piece, said end-piece comprising a first cylindrical hollow part, a conical hollow part and a second cylindrical hollow part, successively, said second cylindrical hollow part ending in an end part of reduced outer diameter delimited by a shoulder, said method comprising at least the following steps, successively:

a) an inner body is achieved by the following sub-steps:
 a tube is achieved by winding pre-impregnated fibres onto a first rotating mandrel, said tube having a wall thickness equal to the height of the shoulder and an outer diameter equal to the maximum outer diameter of the second cylindrical hollow part
 the tube is polymerized,
 the first mandrel is withdrawn from the tube,
 the tube is cut to length and its outer side is roughened, thereby forming the inner body;
b) one end of the inner body is added to the end of reduced outer diameter of each end-piece, said end of the inner body bearing on the shoulder of the end-piece;
c) a first portion of a second mandrel is inserted into the first cylindrical hollow part of each end-piece and a driving jaw is placed at the free end of a second portion of the second mandrel;
d) said pre-impregnated fibres are wound around the outer surface of an assembly formed by the inner body, the end-piece(s) and the jaw-free second portion(s) of the second mandrel(s), said fibres thereby forming an outer body;
e) after the jaw(s) are removed, the inner body and the outer body are polymerized to form a single-piece polymerized body;
f) the second mandrel(s) are removed and the polymerized single-piece body is cut to length.

According to particular embodiments of the invention, the method comprises at least one or a suitable combination of the following characteristics:
 the pre-impregnated fibres wound at steps a) and d) are identical, i.e. they comprise the same resin and the same fibre, and they are continuous;
 the inner diameter of the first cylindrical hollow part is substantially constant;
 the outer diameter of the first cylindrical hollow part is substantially constant and the conical hollow part has a wall thickness which tapers towards the second cylindrical hollow part;
 the outer diameter of the first cylindrical hollow part, starting from its free end, is first constant, then gradually decreases and finally widens again so that it lies in the continuity of the outer side of the conical hollow part, said conical hollow part having a wall thickness which tapers towards the second cylindrical hollow part;
 the outer diameter of the first cylindrical hollow part, starting from its free end, is first constant, then gradually decreases and finally widens again so that it lies in the continuity of the outer side of the conical hollow part, said conical hollow part flaring towards the second cylindrical hollow part and having a discontinuity where the inner diameter of the conical hollow part suddenly increases;
 the end-piece comprises an insert integrating the first cylindrical hollow part and partly the conical hollow part as far as the discontinuity, and comprises a complementary part, also called a layer, integrating the remainder of the conical hollow part and the second cylindrical hollow part;
 the method comprises a least four additional steps for manufacturing said end-piece, said steps being implemented before conducting step b) of the method for manufacturing a connecting rod and being as follows:
 1) the insert is achieved;
 2) the insert is mounted on a third mandrel successively comprising a first cylindrical portion whose shape mates with the first cylindrical hollow part of the end-piece, a first conical portion whose shape mates with the conical hollow part of said insert, an abutment whose height is substantially equal to the thickness of the insert wall at the free end of its conical hollow part, and a second conical portion flaring towards a second cylindrical portion, said first cylindrical portion of the third mandrel being inserted in the first cylindrical hollow part of the end-piece and said end of the insert coming to bear upon the abutment;
 3) one or more layers of said pre-impregnated fibres are wound around the second cylindrical portion and the second conical portion of the third mandrel and partly around the insert up to the discontinuity;
 4) the layer(s) of pre-impregnated fibres are polymerized in an oven in order to form the layer and the third mandrel is then removed;
 the shoulder is formed by placing a clamping ring between step 3) and step 4) or, preferably, by machining after polymerization step 4);
 the insert is metallic;
 the pre-impregnated fibres are identical to those used to perform steps a) and d) and the layer is polymerized with the inner body and the outer body at step e) in order to form a polymerized single-piece body;
 the end-piece is metallic, made of high-strength plastic material or of carbon;
 the fibres are carbon fibres;
 the inner side of the cylindrical hollow part of the end-piece is provided with securing means for the rod;
 the securing means comprise tapping;
 the free end of the conical hollow part of the insert has an outer diameter that is smaller than the inner diameter of the rod body;
 the first portion of the second mandrel is cylindrical and has a diameter substantially equal to the inner diameter of the first cylindrical hollow part of the end-piece, and the second portion of the second mandrel is cylindrical and has a diameter substantially equal to the outer diameter of the first cylindrical hollow part of the end-piece;
 the polymerized single-piece body is cut to length at step f) by cutting at the level of the free end of each end-piece;
 the end-piece comprises lathing grooves on its outer side.

The present invention also relates to a connecting rod comprising a rod body in composite material and at least one end-piece, said end-piece successively comprising a first cylindrical hollow part, a conical hollow part and a second cylindrical hollow part, said second cylindrical hollow part ending in an end portion having a reduced outer diameter delimited by a shoulder, and said rod body comprising a polymerized single-piece body tightly gripping the end-piece or an insert of the end-piece over its entire outer side.

The present invention also relates to an end-piece successively comprising a first cylindrical hollow part, a conical hollow part and a second cylindrical hollow part, the inner diameter of said first cylindrical hollow part being substantially constant and said second cylindrical hollow part ending in an end portion having a reduced outer diameter delimited by a shoulder.

According to particular embodiments of the invention, the end-piece comprises at least one or a suitable combination of the following characteristics:
- the outer diameter of the first cylindrical hollow part is substantially constant and the conical hollow part has a wall thickness tapering towards the second cylindrical hollow part;
- the outer diameter of the first cylindrical hollow part, starting from its free end, is first constant, then gradually decreases and finally widens again so that it lies in the continuity of the outer side of the conical hollow part, said conical hollow part having a wall thickness tapering towards the second cylindrical hollow part;
- the outer diameter of the first cylindrical hollow part, starting from its free end, is first constant, then gradually decreases and finally widens again so that it is lies in the continuity of the outer side of the conical hollow part, said conical hollow part flaring towards the second cylindrical hollow part and having a discontinuity where the inner diameter of the conical hollow part suddenly increases;
- it comprises an insert and a complementary part, also called a layer, said insert integrating the first cylindrical hollow part and partly the conical hollow part as far as the discontinuity, and said complementary part integrating the remainder of the conical hollow part and the second cylindrical hollow part.

Figure 1:
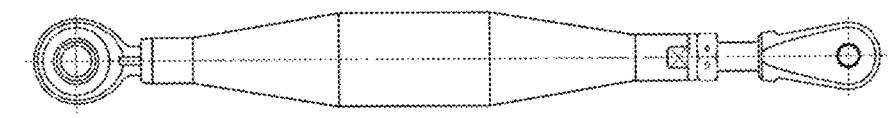
FIG. 1, already mentioned, shows the general diagram of metallic connecting rods as in the state of the art, with different securing means for the rod.
Figure 1:
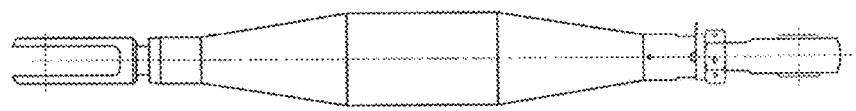
Figure 1:
Figure 2:
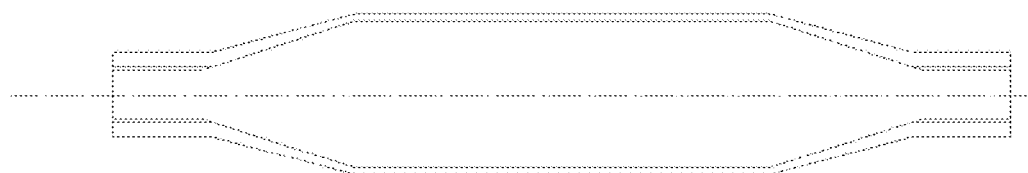
FIG. 2, already mentioned, is a longitudinal section view of a connecting rod as in the state of the art, showing the variation in thickness of the walls.
Figure 3:
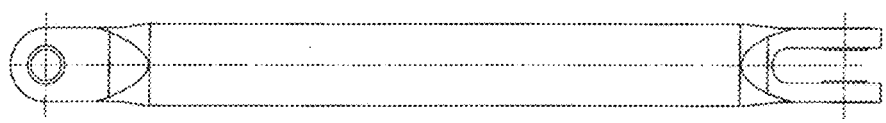
FIG. 3, already mentioned, is a longitudinal section view of a connecting rod of the single-piece type as in the state of the art.
Figure 4:
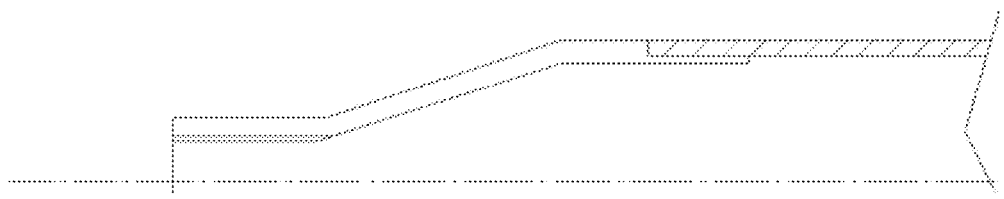
FIG. 4, already mentioned, is a partial, cross-sectional and longitudinal view of a rod body with added and bonded end-pieces as in the state of the art.
Figure 5:
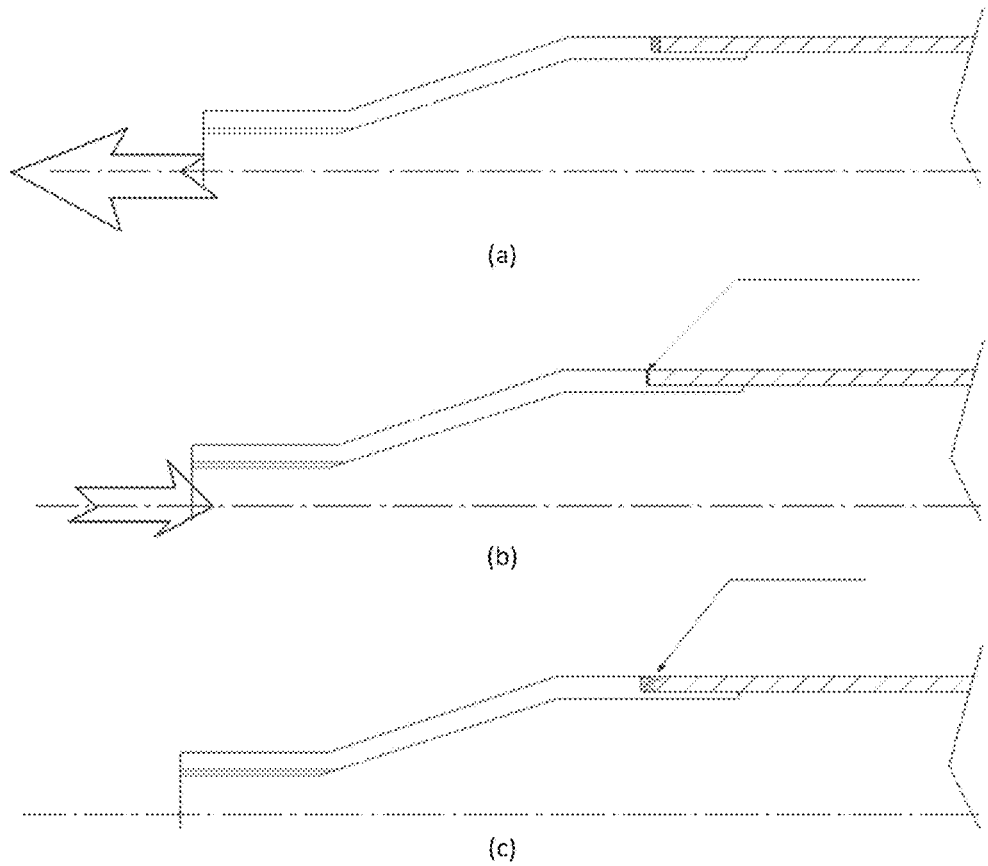
FIG. 5, already mentioned, diagrammatically shows tensile demands (FIG. 5(a)) and compressive demands (FIG. 5(b)) exerted on a rod body with added and bonded end-pieces as in the state of the art, and the resulting damage (FIG. 5(c)).

KEY (1) First cylindrical hollow part of the end-piece
(2) Tapping
(3) Conical hollow part of the end-piece
(4) Second cylindrical hollow part of the end-piece
(5) End of the second cylindrical hollow part of the end-piece with reduced outer diameter
(6) Shoulder
(7) Discontinuity in the conical hollow part of the end-piece
(8) Insert of an end-piece
(9) Complementary part, also called layer, of an end-piece
(10) Third mandrel used for manufacturing an end-piece
(11) First cylindrical portion of the mandrel
(12) First conical portion of the mandrel
(13) Abutment of the mandrel
(14) Second conical portion of the mandrel
(15) Second cylindrical portion of the mandrel
(16) Pre-impregnated fibre

(17) First mandrel used for manufacturing the inner body
(18) Inner body
(19) Second mandrel used for manufacturing the outer body
(19a) First portion of the second mandrel (19)
(19b) Second portion of the second mandrel (19)
(20) Driving jaws
(21) Outer body
(22) Polymerized single-piece body

DETAILED DESCRIPTION OF THE INVENTION

The design of the connecting rod as in the invention lies midway between the single-piece rod and the rod with added, bonded metal end-piece.

In the present invention, the connecting rod comprises a composite rod body and at least one end-piece. The rod may comprise an end-piece at each end, or it may comprise an end-piece at only one end and a bearing at the other end, directly inset into the rod. The figures below give non-limiting illustrations of the method for manufacturing the rod for cases when both ends comprise an end-piece.

First, the end-pieces and their manufacturing method will be described. Thereafter, the method for manufacturing the connecting rod formed by the end-piece(s) and by the rod body will be detailed.

Detailed Description of the End-pieces and their Manufacturing Method

The end-piece as in the invention preferably has three different embodiments. The end-piece may however have any other form useful for implementing the method for manufacture a rod such as described below.

Figure 6:
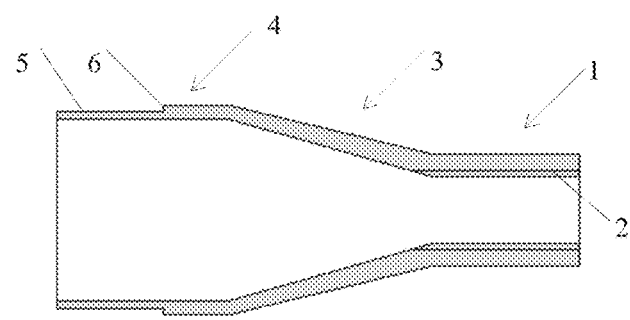
FIG. 6 is a longitudinal section view of an end-piece as in a first embodiment, used when the connecting rod as in the invention is manufactured.
Figure 7:
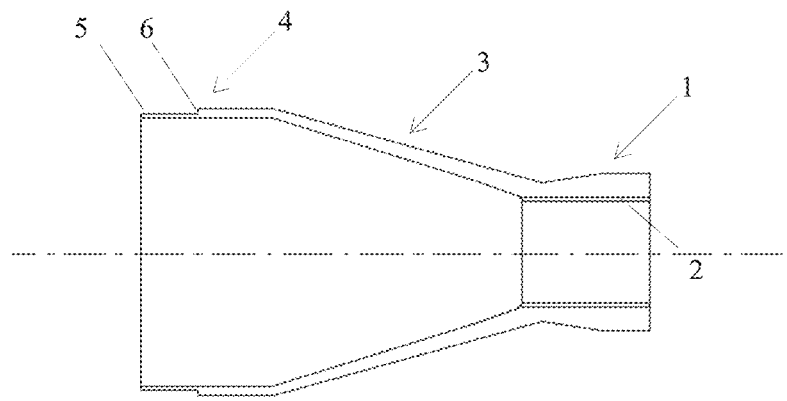
FIG. 7 is a longitudinal section view of an end-piece as in a second embodiment, used when the connecting rod of the invention is manufactured.
Figure 8:
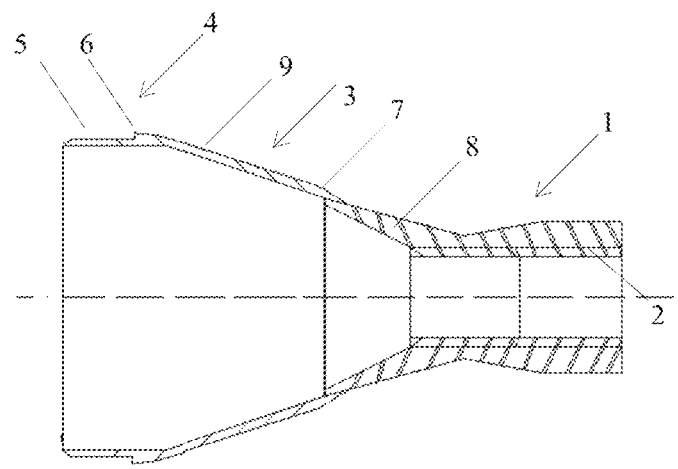
FIG. 8 is a longitudinal section view of an end-piece as in a third embodiment, used when manufacturing the connecting rod of the invention.

The end-pieces as in the three embodiments, shown in FIGS. 6 to 8, respectively, have the common feature that they are formed of three main parts. Each end-piece comprises a first cylindrical hollow part 1 followed by a conical hollow part 3 flaring towards a second cylindrical hollow part 4. By "cylindrical hollow part of the end-piece" is meant that the end-piece comprises a bore of cylindrical shape. The term "inner" is used to designate the side facing the cylindrical bore as opposed to the term "outer" designating the other side.

The first cylindrical hollow part 1 forms the free end of the end-piece after it is assembled with the rod body, and the second cylindrical hollow part 4 is intended to be assembled to the rod body. The first cylindrical hollow part 1 is provided on its inner side with securing means for the rod. In the examples shown in FIGS. 6 to 8, it is tapped (tapping 2) for subsequently receiving a rod-securing element. The securing element may also be an integral part of the end-piece; the end-piece may, for example, be fork-shaped (not shown).

According to the three embodiments of the end-piece, the second cylindrical hollow part 4 ends in an end portion of reduced outer diameter 5 delimited by a shoulder 6.

FIG. 6 shows the different parts forming the end-piece as in a first embodiment of the invention. According to this embodiment, the first cylindrical hollow part 1 has a wall thickness that is substantially equal along the longitudinal axis of the end-piece, and the conical hollow part 3 has a wall thickness tapering towards the second cylindrical hollow part 4.

The end-piece as in a second embodiment of the invention, shown in FIG. 7, has the characteristic that the first cylindrical hollow part 1 varies in wall thickness along the longitudinal axis of the end-piece, whilst always maintaining a bore of cylindrical shape with a substantially constant diameter. Starting from the free end, the outer diameter of the first cylindrical hollow part 1 is first constant, before gradually decreasing and finally widening again so that it lies in the continuity of the outer side of the conical hollow part 3.

The end-piece as in a third embodiment of the invention, shown in FIG. 8, comprises a first cylindrical hollow part 1 substantially comparable to that as in the second embodiment of the end-piece and comprises a second cylindrical hollow part 4 substantially comparable to that as in the first and second embodiments. The end-piece as in the third embodiment has the characteristic that the wall of the conical hollow part 3 has a discontinuity 7. At the level of the discontinuity and in the direction of the increasing cross-section of the conical part, the inner diameter of the conical part suddenly increases. This discontinuity originates from the manufacturing method for the end-piece which is detailed below.

According to this third embodiment, the end-piece comprises an insert 8 integrating the first cylindrical hollow part 1 and partly the conical hollow part 3 as far as the discontinuity 7, and comprises a complementary part 9, also called a layer, integrating the remainder of the conical hollow part 3 and the second cylindrical hollow part 9. According to the invention, the insert 8 and the layer 9 are joined together during the manufacture of the end-piece.

Figure 9:
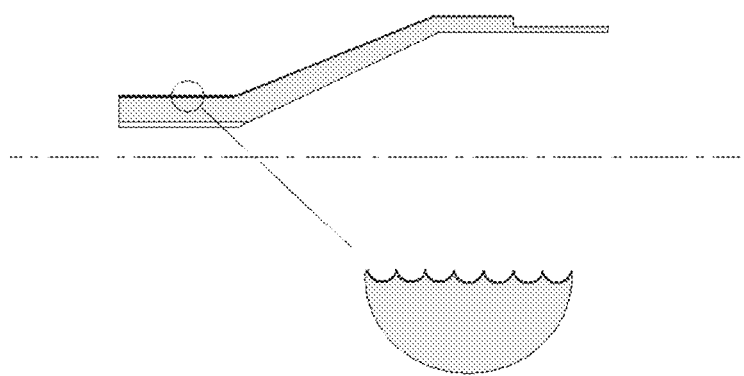
FIG. 9 is a partial cross-sectional and longitudinal view of an end-piece as in the invention having lathing grooves.

According to the first and second embodiment, the end-pieces are preferably metallic (e.g. aluminium, 17-4 stainless steel or titanium) and are conventionally machined; they have lathing grooves on their outer side produced during rapid-advance lathing (see FIG. 9). These grooves will allow the gripping between the end-piece and the reinforcement fibre of the rod. The end-pieces may also be made of a high-strength plastic, of carbon or of any other material suitable for the intended application.

According to the third embodiment of the end-piece, the insert 8 is preferably metallic and the layer 9 is preferably of composite material. This end-piece resorts to an innovative manufacturing method which comprises at least four steps.

Figure 10:
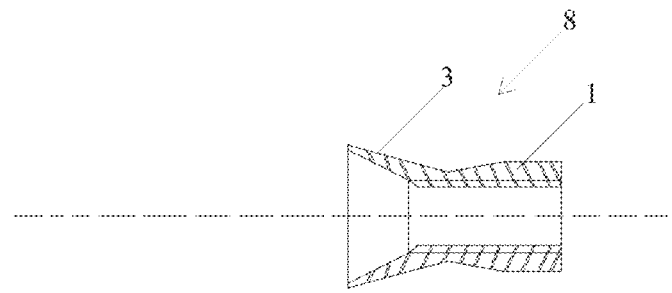
FIG. 10 is a longitudinal section view of the insert prepared at step 1) when the end-piece as in the third embodiment is manufactured.

At a first step 1), the insert 8 is prepared which may be metallic as mentioned above or made of any material adapted for its use (see FIG. 10). The maximum outer diameter of the conical part 3 of the insert is of reduced size compared to the inner diameter of the body of the future connecting rod.

Figure 11:
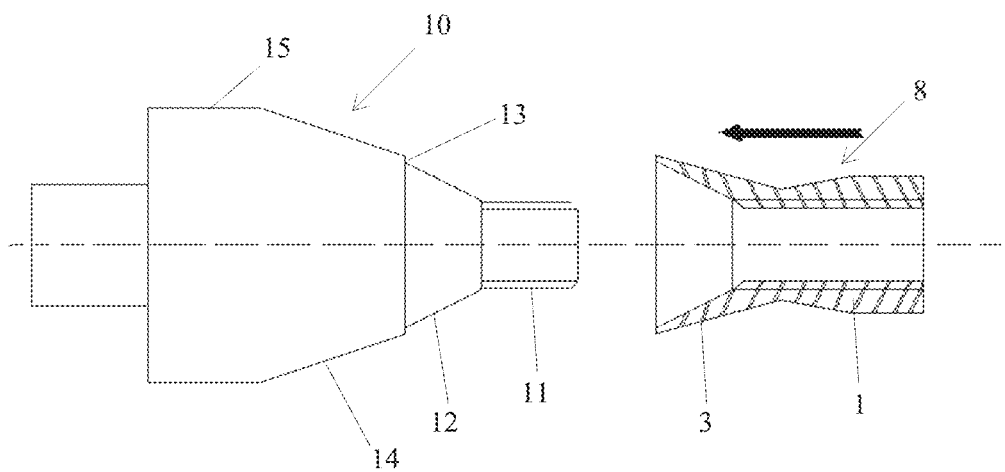
FIG. 11 is a longitudinal section view of the mounting of the insert on the mandrel at step 2) when the end-piece as in the third embodiment is manufactured.

At a second step 2), shown in FIG. 11, the insert 8 is mounted on a metallic mandrel 10. The mandrel 10 comprises a first cylindrical portion 11 which is inserted in the first cylindrical hollow part 1 of the insert and comprises a first conical portion 12 whose shape mates with the conical part 3 of the insert, followed by an abutment 13 against which the insert 8 comes to bear. The height of the abutment 13 is substantially equal to the thickness of the wall of the insert 8 at its end part. After the abutment 13, the mandrel 10 comprises a second conical portion 14 flaring towards a second cylindrical portion 15 whose shape mates with the layer 9 of the end-piece to be formed.

Figure 12:
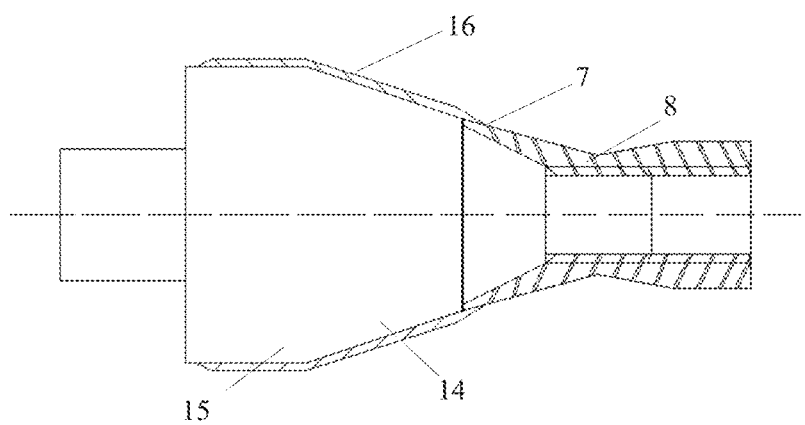
FIG. 12 is a longitudinal section view of step 3) for filament winding when the end-piece as in the third embodiment is manufactured.

At a third step 3), shown FIG. 12, one or several layers of pre-impregnated fibres 16 are deposited by filament winding around the second cylindrical portion 15 and the second conical portion 14 of the mandrel, and partly around the insert 8 up to the discontinuity 7. According to the present invention, the pre-impregnated fibres 16 are identical to those used during the formation of the rod body and are preferably of carbon fibre.

At a fourth step 4), the layer(s) of pre-impregnated fibres 16 are polymerized in an oven in order to form layer 9; the mandrel 10 is then removed (not shown).

The shoulder 6, such as shown in FIG. 8 on the final part, is achieved by placing a clamping ring before polymerization (between step 3) and 4)), or preferably by conventional machining after the polymerization step 4).

The method such as described above applies indifferently for manufacturing the left or right end-piece of a connecting rod.

Similarly to the end-pieces as in the first and second embodiments, the end-piece comprises a lathing groove on its outer side.

Detailed Description of the Method of Manufacturing the Connecting Rod

According to the present invention, the rod is manufactured in six steps. By way of illustration the method for manufacturing the rod is illustrated in FIGS. 13 to 20 with end-pieces as in the first embodiment. The method with end-pieces as in the second and third embodiments is similar.

Figure 13:
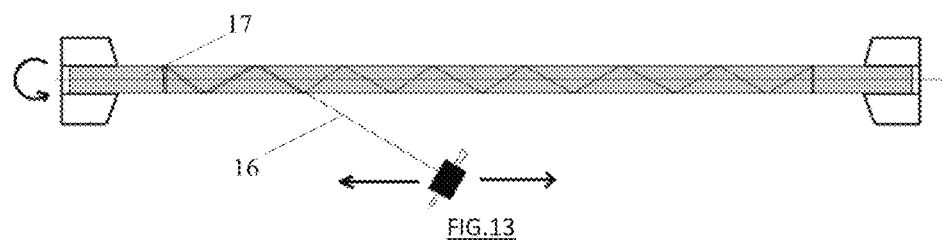
FIG. 13 is a side view of the formation of the inner body of the connecting rod by filament winding as in the invention (step a)).

A first step a) consists in forming an inner body by the conventional filament winding method, in which a pre-impregnated fibre 16 is wound onto a smooth mandrel 17 at a given angle using a to-and-fro movement as shown in FIG. 13. Preferably, the wound fibres are carbon fibres. However, any other high-strength fibre may also be suitable.

A tube is formed with a thickness that is equal to the height of the above-mentioned shoulder 6. The inner diameter of the tube is determined by the inner diameter of the body of the rod to be formed and on the basis of dimensioning calculations to determine the maximum compression load that the tube can withstand without deforming at the level of the bearing zone between the end-piece and the tube i.e. at the level of the shoulder.

Figure 14:
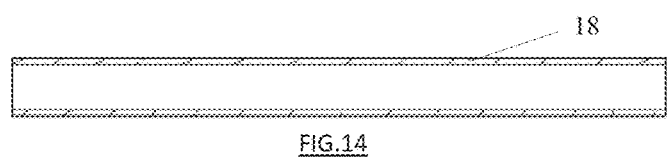
FIG. 14 is a longitudinal section view of the inner body of the rod obtained at step a).
Figure 15:
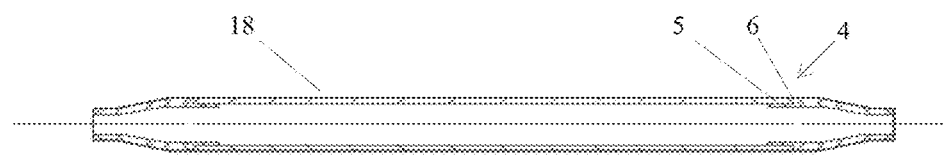
FIG. 15 is a longitudinal section view of the assembling of the end-pieces with the inner body of the rod (step b)).

The tube and mandrel assembly is then placed in an oven to polymerize the resin pre-impregnating the fibres and thereby rigidify the tube. After polymerization, the mandrel 17 is removed and the tube is cut to length and roughened to obtain an adhering surface. The inner body 18 thus obtained is shown in FIG. 14.

A second step b) consists in adding an end-piece to each end of the inner body. The added end-piece is an end-piece as in the first, second or third embodiment such as shown in FIGS. 6 to 8, respectively, or any end-piece of adapted shape. The end of the inner body 18 is joined to the end having a reduced outer diameter 5 and bears against the shoulder 6. In this way, the outer surface of the inner body 18 extends that of the second cylindrical part 4 of the end-pieces (see FIG. 15).

Figure 16:
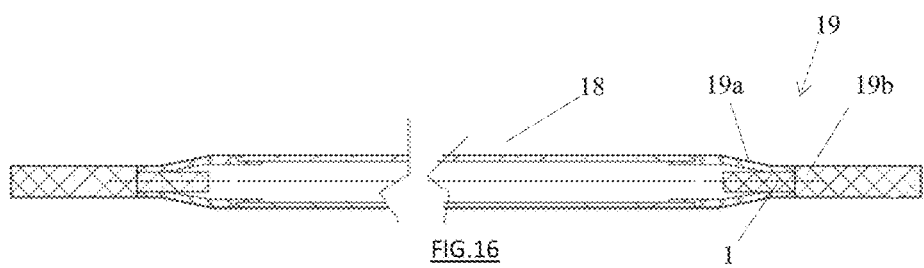
FIG. 16 is a longitudinal section view of the mounting of the mandrels at step c) of rod manufacture.
Figure 17:
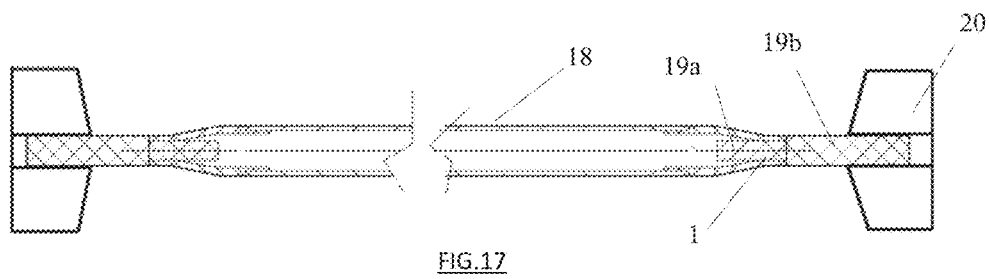
FIG. 17 is a longitudinal section view of the mounting of the driving jaws at step c) of rod manufacture.

At a third step c), two mandrels 19 are mounted at the respective free ends of the end-pieces (see FIG. 16). Each mandrel of cylindrical shape comprises two portions of different diameters. A first portion 19a of the mandrel comprises a cylinder of a diameter that is substantially equal to the inner diameter of the first cylindrical hollow part of the end-pieces 1, and a second portion 19b comprises a cylinder of a diameter that is substantially equal to the outer diameter of the first cylindrical hollow part of the end-pieces 1. During assembly, the first portion 19a of the mandrel 19 is inserted into the cylindrical hollow part 1 of the end-piece. A driving jaw 20 is then arranged at the free end of the second portion 19b of the mandrel 19 (see FIG. 17).

Figure 18:
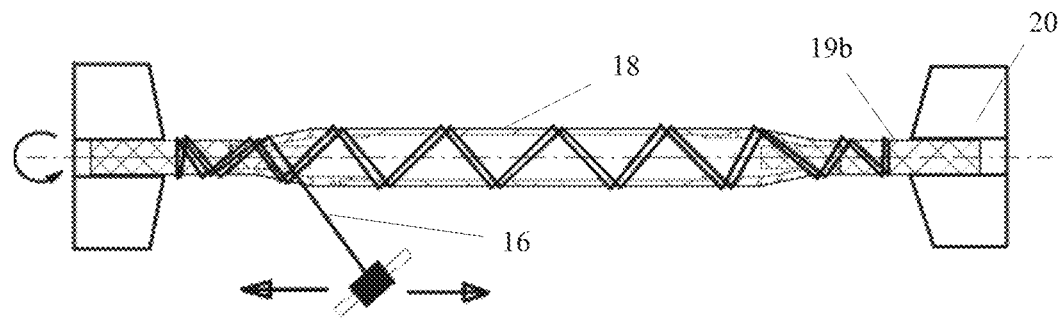
FIG. 18 is a longitudinal section view of the formation of the outer body by filament winding at step d) of rod manufacture.
Figure 19:
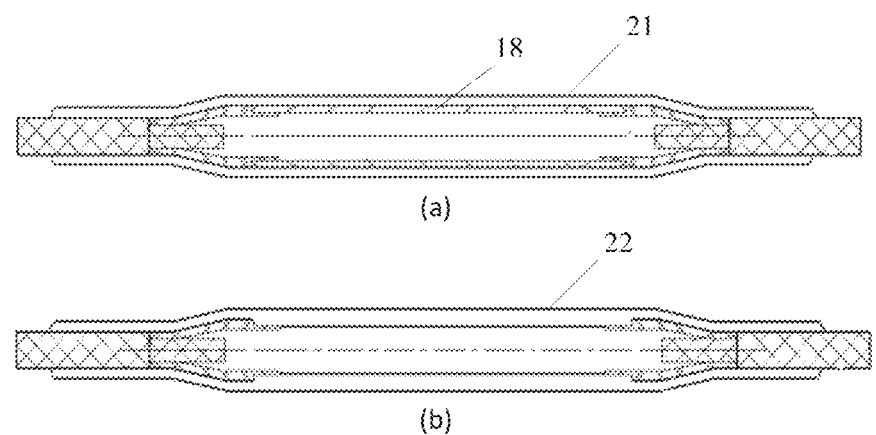
FIG. 19 shows longitudinal section views of the assembly before a) and after b) polymerization at step e) of rod manufacture.

The fourth step d) shown in FIG. 18 consists in winding pre-impregnated fibres 16 over the outer surface of the assembly formed by the inner body 18, the end-pieces, and the jaw-free second portion 19b of the mandrels, by the filament winding method. The fibres will form a layer around this assembly which will be called the outer body 21 (see FIG. 19 (a)). In order to subsequently form a single-piece body as described below, the pre-impregnated fibres used at this step are the same (same fibre, same resin) as those used at step a). Similarly, to ensure the continuity of the filament winding, there is no interruption of the fibre in steps a) and d).

The fifth step e) consists in polymerizing the assembly after the driving jaws 20 are removed. FIGS. 19(a) and 19(b) show the assembly before and after polymerization, respectively. After polymerization, the inner body 18 and the outer body 21 form a polymerized single-piece body 22 which will form the body of the connecting rod. In the particular case of the end-piece as in the third embodiment such as shown in FIG. 8, the layer 9 formed of pre-impregnated fibres 16 identical to those used to achieve the body of the connecting rod, is also part of the polymerized single-piece body 22. When the jaws are dismounted at this step, the fibre is cut from the reel and the polymerized single-piece body part comprising the cut fibre is removed when the connecting rod is cut to length at the last step f).

Figure 20:
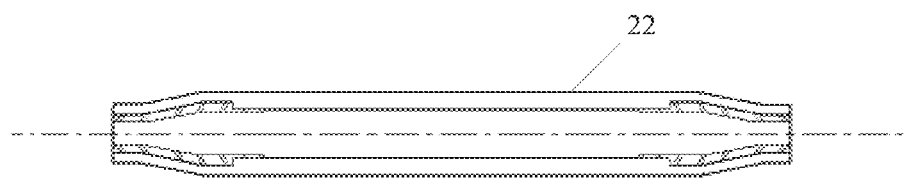
FIG. 20 is a longitudinal section view of the finished part (connecting rod) after the mandrels are removed and a cutting operation (step f)), the end-pieces being obtained as in the first embodiment.
Figure 21:
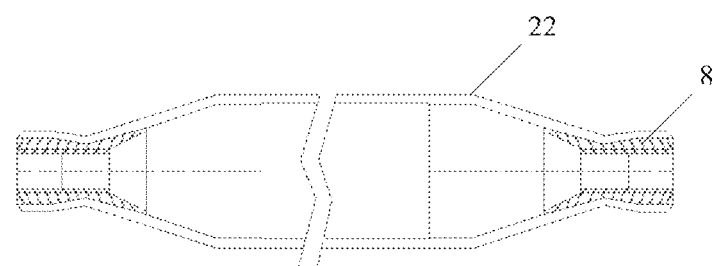
FIG. 21 is a longitudinal section view of the finished part (connecting rod) after the mandrels are removed and a cutting operation (step f)), the end-pieces being obtained as in the third embodiment.

At the last step f), the mandrels 19 are removed and the polymerized single-piece body 22 is cut at the level of the free end of the end-pieces (see FIG. 20). The part thus obtained forms the connecting rod as in the invention. FIG. 21 shows the rod formed with the end-pieces as in the third embodiment, in which the layer 9 of the end-piece is integrated into the single-piece body 22.

According to the invention, the fibers are preferably carbon fibers and the resin must be chosen to ensure a sufficient rigidity for all of the component parts of the connecting rod before the post-curing step e). For example, it may be an epoxy resin.

It will be specified that the shapes of the mandrel, the bodies and the end-pieces are provided as an illustration. The cylindrical part of the end-piece or bodies may have a section other than circular, such as oval, square, etc., the shape of the mandrel being modified accordingly.

The expression "single-piece body" according to the invention means that the rod body is made in a one and same composite material without adding other materials such as glue, adhesive or glass fabric. This means that the structure is homogenous (without any discontinuity) over the entire vertical or longitudinal section of the rod body irrespective of the location where the cut is made. The homogenous structure has thus no joint plane, junction defect or interface defect.

Advantages of the Method of the Invention

According to the present invention, the pre-impregnated fibres used at steps a) and d) are identical (same resin, same fibre) and there is continuity between the filament windings (same filament) for the inner body and the outer body. Using one same resin allows to form a single-piece body during post-curing at step e), that will be devoid of any differential heat-expansion problem. The use of the filament winding technique and the continuity of the filament for the steps of manufacturing the inner body and the outer body is important to guarantee a correct positioning of the fibres and to guarantee a 100% automated process. The manufacture of a single-piece body and the continuity of the filament winding also allows to obtain a product devoid of any discontinuity or porosity.

The manufacture of connecting rods with end-pieces formed as in the third embodiment allows to reduce the weight of the rod. On the one hand because part of the end-piece is in composite material and on the other because there is a smaller amount of material in the end-piece. Indeed, at the level of the discontinuity, the inner diameter of the end-piece increases which in other words corresponds to a removal of material.

Figures 22, 23:
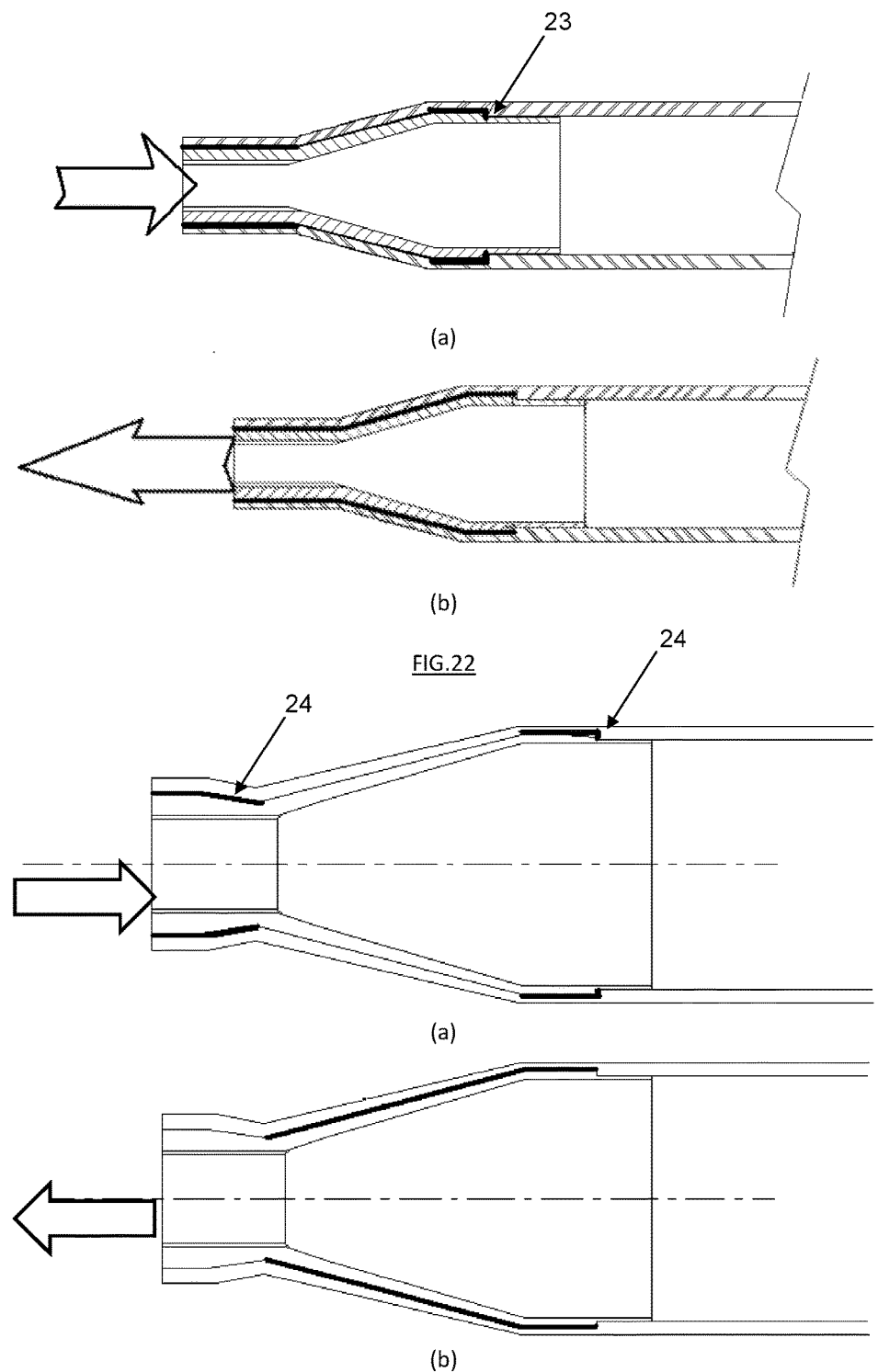
FIG. 22 diagrammatically shows the compression demands (a) and tensile demands (b) exerted on the rod obtained as in the invention with end-pieces as in the first embodiment.
FIG. 23 diagrammatically shows the compression demands (a) and tensile demands (b) exerted on the rod obtained as in the invention with end-pieces as in the second embodiment.

Unlike the bonded assembly of the prior art, in which the end-pieces are adjoined to the rod body, the end-pieces of the present invention are inserted inside the rod body. This design of the rod will allow to take the load of the compression forces. For a connecting rod with end-pieces obtained as in the first embodiment, the highlighted zones 23 in FIG. 22(a) are regions on which demand is placed firstly by a gripping effect between the end-piece and the rod body, and secondly by direct bearing between the rod body in carbon fibre and the end-piece at the level of the shoulder. In the event of too heavy loading, only the bearing zone at the level of the shoulder needs to be fractured in order to move the end-piece (see small arrow). The geometry of the end-piece as in the second embodiment has the advantage that two zones instead of one need to be fractured in the event of overload. As shown in FIG. 23(a) by the small arrows 24, there is the bearing zone at the level of the shoulder and the zone where the first cylindrical hollow part of the end-piece is narrowing. In concrete terms, this means that the geometry of the end-piece as in the second embodiment allows to take the load of more forces. The design of the connecting rod as in the invention will also allow to take the load of tensile forces, irrespective of the geometry of the end-piece. For a connecting rod with end-pieces formed as in the first embodiment such as shown in FIG. 22(b), the end-piece transmits the tensile force to the rod body via the first cylindrical hollow part, via the conical part and partly via the second cylindrical hollow part. The tensile force is therefore directly transmitted to the body of the rod. For a rod with end-pieces formed as in the second embodiment such as shown in FIG. 23(b), the end-piece transmits the tensile force to the rod body via the conical part and partly via the second cylindrical hollow part. In the frame of alternate tensile-compression stresses, the end-piece, whatever its geometry, cannot move inside the rod body and therefore cannot generate a fatigue phenomenon on the carbon fibre body and a phenomenon of plastic deformation of the carbon-fibre body.

The method as in the invention also advantageously allows the manufacture of a complex part using conventional filament winding methods, which generates low production costs. The gain is found in the implementation of the methods and in the design of the connecting rod itself.

The invention claimed is:

1. A method for making a connecting rod by filament winding, said method comprising the steps of:
   providing a first mandrel;
   manufacturing an inner body by
   filament winding pre-impregnated fibres onto the first mandrel,
   polymerising said pre-impregnated fibre and,
   removing said mandrel;
   manufacturing an outer body by filament winding pre-impregnated fibres onto the outer surface of the inner body, said pre-impregnated fibres being identical to those used for the manufacturing of the inner body;
   forming a single-piece body by polymerising the inner body and the outer body.

2. The method as in claim 1, which further comprises a step of positioning a rod end at one or both end(s) of the inner body before manufacturing the outer body, the pre-impregnated fibres being then wound onto the outer surface of the inner body and of the rod end(s) for manufacturing the outer body.

3. The method as in claim 1, wherein the winding is continuous for the manufacturing of the inner body and the outer body.

4. The method as in claim 2, wherein, in the step of positioning the rod end, a part of the rod end is inserted inside the inner body.

5. A method for making a connecting rod by filament winding, said method comprising the steps of:
   providing a first mandrel;
   manufacturing an inner body by
   filament winding pre-impregnated fibres onto the first mandrel,
   polymerising said pre-impregnated fibre and,
   removing said mandrel;
   manufacturing an outer body by filament winding pre-impregnated fibres onto the outer surface of the inner body, said pre-impregnated fibres being identical to those used for the manufacturing of the inner body;
   forming a single-piece body by polymerising the inner body and the outer body;
   further comprising a step of positioning a rod end at one or both end(s) of the inner body before manufacturing the outer body, the pre-impregnated fibres being then wound onto the outer surface of the inner body and of the rod end(s) for manufacturing the outer body; and
   further comprising the following steps for manufacturing the rod end, said rod end comprising a composite layer partly covering an insert:
   providing the insert and a second mandrel;
   positioning the insert on the second mandrel;
   winding pre-impregnated fibres partly around the second mandrel and partly around the insert, said pre-impregnated fibres being identical to those used for manufacturing the inner body and the outer body;
   polymerising the pre-impregnated fibres and removing the second mandrel, said polymerised pre-impregnated fibres forming the composite layer.

6. The method as in claim 5, wherein the composite layer is polymerized with the inner body and the outer body to form the single-piece body.

* * * * *